US011816418B2

(12) United States Patent
Liu et al.

(10) Patent No.: US 11,816,418 B2
(45) Date of Patent: Nov. 14, 2023

(54) COMPACT DESIGN METHOD FOR INDUCTIVE FILTERING TRANSFORMER

(71) Applicant: Central South University, Hunan (CN)

(72) Inventors: Qianyi Liu, Hunan (CN); Fang Liu, Hunan (CN); Runmin Zou, Hunan (CN); Yong Li, Hunan (CN); Shaoyang Wang, Hunan (CN)

( * ) Notice: Subject to any disclaimer, the term of this patent is extended or adjusted under 35 U.S.C. 154(b) by 223 days.

(21) Appl. No.: 17/333,002

(22) Filed: May 27, 2021

(65) Prior Publication Data

US 2021/0286929 A1    Sep. 16, 2021

(30) Foreign Application Priority Data

Apr. 22, 2021    (CN) .......................... 202110435475.3

(51) Int. Cl.
  *G06F 30/39*        (2020.01)
  *G06F 30/398*       (2020.01)
  *H01F 27/24*        (2006.01)
  *H01F 27/28*        (2006.01)
  *G06F 111/10*       (2020.01)

(52) U.S. Cl.
  CPC ........... *G06F 30/398* (2020.01); *H01F 27/24* (2013.01); *H01F 27/28* (2013.01); *G06F 2111/10* (2020.01)

(58) Field of Classification Search
  CPC .... G06F 30/398; G06F 2111/10; G06F 30/36; G06F 30/20; H01F 27/24; H01F 27/28; H01F 38/08; H01F 27/38; H01F 27/306
  USPC ......................................................... 716/132
  See application file for complete search history.

(56) References Cited

U.S. PATENT DOCUMENTS

| 2013/0044522 A1* | 2/2013 | Anghel ................. G01R 31/52 363/35 |
| 2017/0353101 A1* | 12/2017 | Li ......................... H02M 7/537 |

* cited by examiner

*Primary Examiner* — Paul Dinh

(57) ABSTRACT

The disclosure relates to a compact design method for inductive filtering transformer. According to the disclosure, the inductive filtering transformer adopts an approximative zero-impedance design under the premise of satisfying the filtering performance. The direct optimization objective is to minimize the distance from the transformer core center to the outermost winding. This disclosure balances the constraint of winding impedance matching and transformer size optimization and satisfies the application of limited installation space.

1 Claim, 2 Drawing Sheets

COMPACT DESIGN METHOD FOR INDUCTIVE FILTERING TRANSFORMER

CROSS REFERENCE TO RELATED APPLICATIONS

The present application claims the benefit of Chinese Patent Application No. 2021104354753 filed on Apr. 22, 2021, the contents of which are incorporated herein by reference in their entirety.

FIELD OF THE INVENTION

The invention belonging to the field of transformer design and manufacture involves a compact design method for inductive filtering transformer.

BACKGROUND OF THE INVENTION

Integration, modularization, and systematization are the design concept for the future all-electric shipboard power system. Compared with a traditional shipboard supply system, all-electric shipboard has the advantages of optimization of equipment configuration, improvement of space utilization, enhancement of shipboard stability, and improvement of shipboard crypticity. Due to the deprecation of the rotary converter set, the power electronic converter becomes the core of increasing electrical equipment.

Harmonic performance is an essential requirement of an all-electric shipboard power system based on the power electronic converter. Taking propulsion transformer as an example, harmonic components can drive heat loss within the transformer. These losses include eddy currents, hysteresis, copper losses, and stray flux losses, which can cause failure due to overheating. Moreover, the potential resonance may be excited between transformer winding inductance and supply capacitance in some extreme cases. To enhance the power system robustness, the additional capacity of the transformer is always required when supplying nonlinear loads.

At present, in the field of power optimization of shipboard power systems, there is a lack of a solution that takes into account both filtering performance and space utilization.

SUMMARY OF THE INVENTION

The technical problem solved by the invention is to provide a compact design method for inductive filtering transformer to balance the constraint of winding impedance matching and transformer size optimization while satisfying the inductive filtering performance.

To achieve these technical indexes, the technical scheme of the invention is used as follows:

The compact design method for inductive filtering transformer, which includes the inductive filtering transformer with approximative zero-impedance design. The transformer dimension parameter is related to the equivalent winding impedance. The minimum radial dimension of the transformer is searched in the interval of approximative zero-impedance, to achieve the optimization of transformer dimension parameters.

The inductive filtering transformer includes primary winding, secondary winding, and filtering winding, the primary winding is connected to a power source; the secondary winding is connected to a load; the filtering winding is connected to a filter. The secondary winding is arranged closest to the core, followed by the filter winding and the primary winding.

The inductive filtering transformer satisfies zero-impedance design of filtering winding. On the basis of satisfying the filtering performance, the filtering winding can also be designed with approximately zero-impedance. The equivalent impedance of filtering winding is calculated by:

$$Z_3 = (Z_{k13} + Z_{k23} - Z_{k12})/2 \in [-x, x]$$

where $Z_{k12}$, $Z_{k13}$, and $Z_{k23}$ are the short-circuit impedance between primary winding and secondary winding, primary winding and filtering winding, and secondary winding and filtering winding. $Z_3$ is the equivalent impedance of filtering winding. $[-x, x]$ is the interval of approximative zero-impedance. To satisfy the filtering performance, $x \leq 0.1\%$.

Equivalent winding impedance is calculated by the formulas containing the winding size parameters. Specifically, the short-circuit impedance is calculated by:

$$\begin{cases} Z_{k12} = \dfrac{2\pi^2 f \mu_0 N_1 I_1 \rho_{12} K \sum D_{12}}{H_{12} e_t} \\ Z_{k13} = \dfrac{2\pi^2 f \mu_0 N_1 I_1 \rho_{13} K \sum D_{13}}{H_{13} e_t} \\ Z_{k23} = \dfrac{2\pi^2 f \mu_0 N_1 I_1 \rho_{23} K \sum D_{23}}{H_{23} e_t} \end{cases}$$

where f is the fundamental frequency; $I_1$ and $N_1$ are the rated current and turns of primary winding; $\mu_0$ is absolute permeability, and $$\mu_0 = 4\pi \times 10^{-7}$$

H/m; $\rho_{xy}$ is the Rogowski coefficient between Wx and Wy; K is additional reactance coefficient; $\Sigma D_{xy}$ is the magnetic flux leakage area between Wx and Wy; $e_t$ is the electric potential of each turn; $H_{xy}$ is arithmetic mean height of Wx and Wy.

For the longitudinal leakage field of core structure transformer, Rogowski coefficient is calculated by:

$$\begin{cases} \rho_{12} = 1 - \dfrac{a_2 + a_{23} + a_3 + a_{31} + a_1}{\pi H_{12}} \\ \rho_{13} = 1 - \dfrac{a_3 + a_{31} + a_1}{\pi H_{13}} \\ \rho_{23} = 1 - \dfrac{a_2 + a_{23} + a_3}{\pi H_{13}} \end{cases}$$

The magnetic flux leakage area is determined by:

$$\begin{cases} \sum D_{12} = \dfrac{a_1 r_1}{3} + \dfrac{a_2 r_2}{3} + \dfrac{(a_{23} + a_3 + a_{31})(r_2 + a_2/2 + r_{31} + a_{31}/2)}{2} \\ \sum D_{13} = \dfrac{a_1 r_1}{3} + \dfrac{a_3 r_3}{3} + a_{31} r_{31} \\ \sum D_{23} = \dfrac{a_2 r_2}{3} + \dfrac{a_3 r_3}{3} + a_{23} r_{23} \end{cases}$$

Besides, the following relationships are established.

$$\begin{cases} r_2 = r_0 + a_{02} + \dfrac{a_2}{2} \\ r_{23} = r_0 + a_{02} + a_2 + \dfrac{a_{23}}{2} \\ r_3 = r_0 + a_{02} + a_2 + a_{23} + \dfrac{a_3}{2} \\ r_{31} = r_0 + a_{02} + a_2 + a_{23} + a_3 + \dfrac{a_{31}}{2} \\ r_1 = r_0 + a_{02} + a_2 + a_{23} + a_3 + a_{31} + \dfrac{a_1}{2} \\ r_4 = r_0 + a_{02} + a_2 + a_{23} + a_3 + a_{31} + a_1 + a_{14} + \dfrac{a_4}{2} \end{cases} ;$$

where $r_0$ is core radius; $r_1$, $r_2$, and $r_3$ are the center distance between core and winding; $r_{23}$ and $r_{31}$ are the center distance between the core and air gap; $a_1$, $a_2$, and $a_3$ are the winding thickness; $a_{02}$, $a_{23}$, and $a_{31}$ are the insulation distance between core and winding, or any two windings.

The direct optimization objective is to minimize the radial dimension of the inductive filtering transformer. The radial dimension is defined as the distance from the transformer core center to the outermost winding. That is, $$d_{min} = d = r_0 + a_{02} + a_2 + a_{23} + a_3 + a_{31} + a_1$$

Compared with the conventional art, the disclosure has beneficial effects as follows:

The invention adopts approximative zero-impedance design under the premise of ensuring the satisfactory filtering performance, which realize the transformer optimization of radial dimension. The invention satisfies the application of limited installation space, and extends the application range of inductive filtering transformer.

DETAILED DESCRIPTION OF PREFERRED EMBODIMENTS

Combined the descriptive figure with the concrete implementing case, the following part will have a detailed illustration of the technical scheme of the invention.

Figure 1:
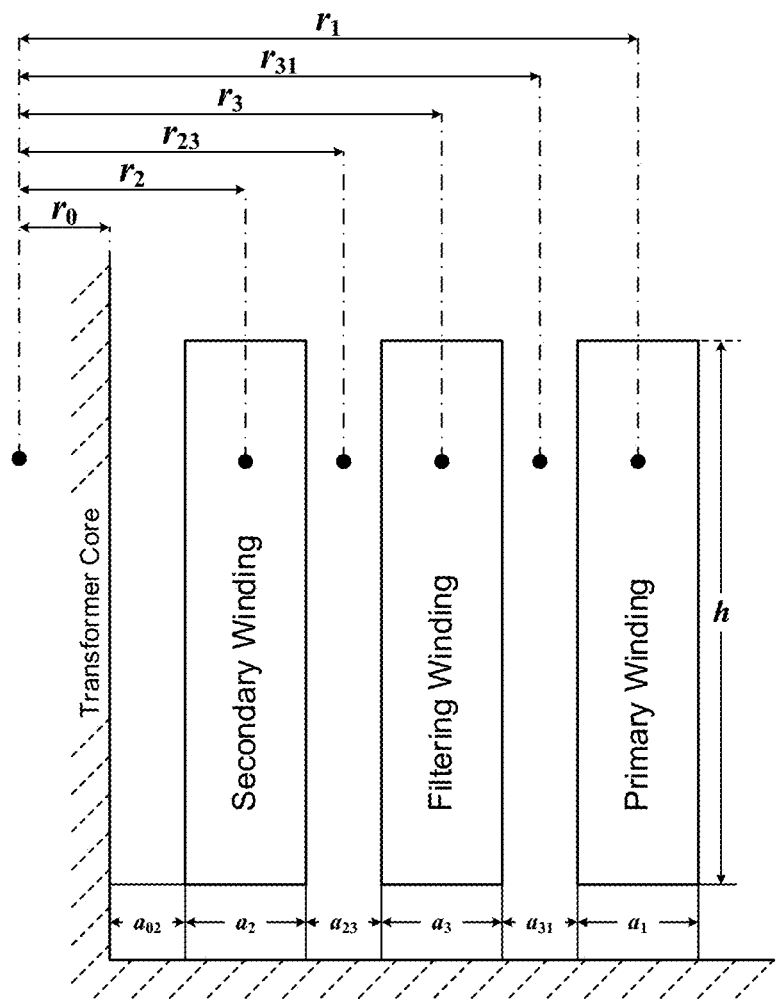
FIG. 1 is a winding arrangement diagram of an inductive filtering transformer.

The invention proposed a compact design method for an inductive filtering transformer. FIG. 1 is a winding arrangement diagram of an inductive filtering transformer, which involves three windings: the primary winding connected to power source, the secondary winding connected to load and the filtering winding connected to filter. The secondary winding is arranged closest to the core, followed by the filter winding and the primary winding.

To make harmonic components offset inductively between filtering winding and secondary winding, the equivalent impedance of filtering winding should satisfy zero-impedance design. On the basis of satisfying the filtering performance, it can also be designed with approximately zero-impedance. That is, $$Z_3 = (Z_{k13} + Z_{k23} - Z_{k12})/2 \in [-x, x]$$

where $Z_{k12}$, $Z_{k13}$ and $Z_{k23}$ are the short-circuit impedance between primary winding and secondary winding, primary winding and filtering winding, and secondary winding and filtering winding. $Z_3$ is the equivalent impedance of filtering winding. $[-x, x]$ is the interval of approximative zero-impedance. To satisfy the filtering performance, $x \leq 0.1\%$. In this embodiment, $x = 0.1\%$.

FIG. 1 shows the dimension parameters of inductive filtering transformer. $r_0$ is transformer core radius; $r_1$, $r_2$, and $r_3$ are the center distance between transformer core and winding; $r_{23}$ and $r_{31}$ are the center distance between transformer core and air gap; $a_1$, $a_2$, and $a_3$ are the winding thickness; $a_{02}$, $a_{23}$ and $a_{31}$ are the insulation distance between transformer core and winding, or any two windings. The following relationships are established.

$$\begin{cases} r_2 = r_0 + a_{02} + \dfrac{a_2}{2} \\ r_{23} = r_0 + a_{02} + a_2 + \dfrac{a_{23}}{2} \\ r_3 = r_0 + a_{02} + a_2 + a_{23} + \dfrac{a_3}{2} \\ r_{31} = r_0 + a_{02} + a_2 + a_{23} + a_3 + \dfrac{a_{31}}{2} \\ r_1 = r_0 + a_{02} + a_2 + a_{23} + a_3 + a_{31} + \dfrac{a_1}{2} \\ r_4 = r_0 + a_{02} + a_2 + a_{23} + a_3 + a_{31} + a_1 + a_{14} + \dfrac{a_4}{2} \end{cases} ;$$

The short-circuit impedance between any two windings is calculated by, $$\begin{cases} Z_{k12} = \dfrac{2\pi^2 f \mu_0 N_1 I_1 \rho_{12} K \sum D_{12}}{H_{12} e_t} \\ Z_{k13} = \dfrac{2\pi^2 f \mu_0 N_1 I_1 \rho_{13} K \sum D_{13}}{H_{13} e_t} \\ Z_{k23} = \dfrac{2\pi^2 f \mu_0 N_1 I_1 \rho_{23} K \sum D_{23}}{H_{23} e_t} \end{cases}$$

where f is the fundamental frequency; $I_1$ and $N_1$ are the rated current and turns of primary winding; $\mu_0$ is absolute permeability, and $$\mu_0 = 4\pi \times 10^{-7}$$

H/m; $\rho_{xy}$ is the Rogowski coefficient between Wx and Wy; K is additional reactance coefficient; $\Sigma D_{xy}$ is the magnetic flux leakage area between Wx and Wy; $e_t$ is the electric potential of each turn; $H_{xy}$ is arithmetic mean height of Wx and Wy.

For the longitudinal leakage field of core structure transformer, Rogowski coefficient is calculated by, $$\begin{cases} \rho_{12} = 1 - \dfrac{a_2 + a_{23} + a_3 + a_{31} + a_1}{\pi H_{12}} \\ \rho_{13} = 1 - \dfrac{a_3 + a_{31} + a_1}{\pi H_{13}} \\ \rho_{23} = 1 - \dfrac{a_2 + a_{23} + a_3}{\pi H_{13}} \end{cases}$$

The magnetic flux leakage area is determined by, $$\begin{cases} \sum D_{12} = \dfrac{a_1 r_1}{3} + \dfrac{a_2 r_2}{3} + \dfrac{(a_{23} + a_3 + a_{31})(r_2 + a_2/2 + r_{31} + a_{31}/2)}{2} \\ \sum D_{13} = \dfrac{a_1 r_1}{3} + \dfrac{a_3 r_3}{3} + a_{31} r_{31} \\ \sum D_{23} = \dfrac{a_2 r_2}{3} + \dfrac{a_3 r_3}{3} + a_{23} r_{23} \end{cases}$$

Figure 2:
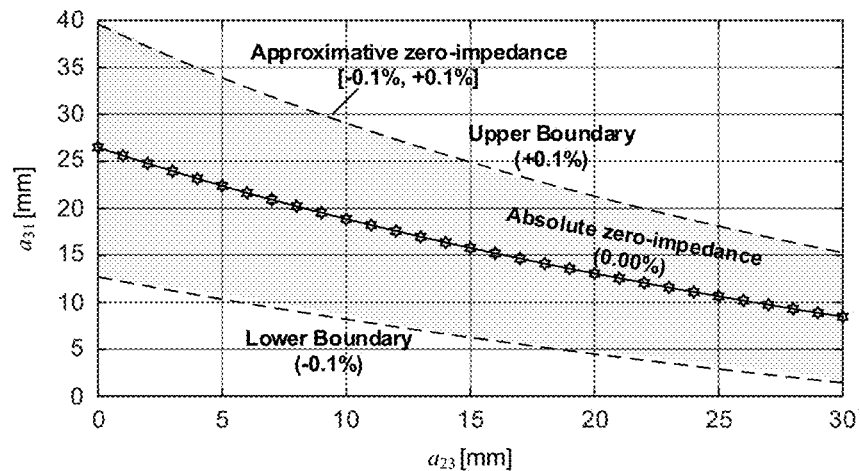
FIG. 2 is a range diagram of approximative zero-impedance.

After the main parameters (rated capacity, rated voltage) of the transformer are determined, the adjustment margin of winding thickness or winding height is very small. The fine-tuning of insulation distance $a_{23}$ and $a_{31}$ is a feasible way to realize the desired impedance. FIG. 2 gives the one-to-one correspondence of $a_{23}$ and $a_{31}$ in the interval of absolute zero-impedance ($Z_3$=0%) and approximative zero-impedance ($Z_3 \in$ [−0.1%, +0.1%]). In the approximative zero-impedance area bounded by the lower and upper boundaries, dimensional parameters $a_{23}$ and $a_{31}$ satisfy the approximative zero-impedance to implement inductive filtering.

The direct optimization objective is to minimize the radial dimension of the inductive filtering transformer. The radial dimension is defined as the distance from the transformer core center to the outermost winding. That is, $$d_{min} = \min(d) = \min(r_0 + a_{02} + a_2 + a_{23} + a_3 + a_{31} + a_1)$$

To obtain $d_{min}$, $a_{23}$ and $a_{31}$ are searched in the interval of approximative zero-impedance.

Figure 3:
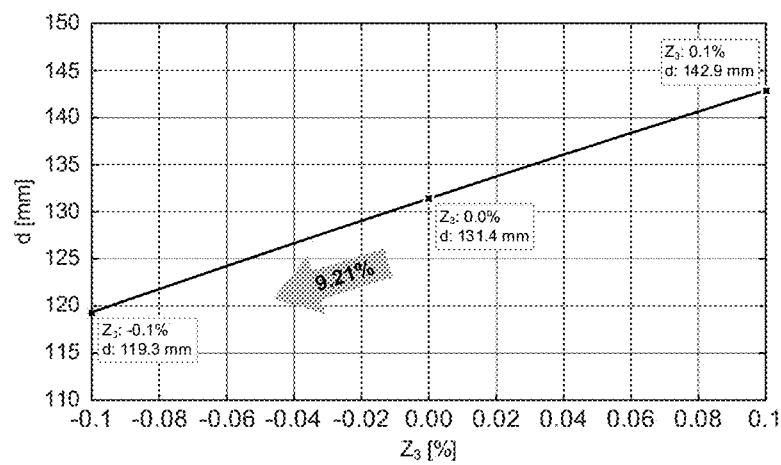
FIG. 3 is a minimum radial dimension distribution of inductive filtering transformer.

FIG. 3 shows the optimization result. Compared with absolute zero-impedance, the minimum radial dimension search in the interval of approximative zero-impedance is reduced by 9.21%.

The invention adopts an approximative zero-impedance design under the premise of ensuring satisfactory filtering performance, which realizes the transformer optimization of radial dimension. The invention satisfies the application of limited installation space and extends the application range of inductive filtering transformers.

What is claimed is:

1. A compact design method for an inductive filtering transformer, wherein the inductive filtering transformer comprises a transformer core, a primary winding, a secondary winding, and a filtering winding; wherein
the primary winding is connected to a power source; the secondary winding is connected to a load; the filtering winding is connected to a filter; the secondary winding is arranged closest to the transformer core, followed by the filter winding and the primary winding; wherein the method comprising:
S1: designing an approximative zero-impedance for the filtering winding; wherein
an equivalent impedance of the filtering winding is calculated by:

$$Z_3 = (Z_{k13} + Z_{k23} - Z_{k12})/2 \in [-x, x];$$

where $Z_{k12}$, $Z_{k13}$, and $Z_{k23}$ are short-circuit impedance between the primary winding and the secondary winding, the primary winding and the filtering winding, and the secondary winding and the filtering winding, [−x, x] is an interval of approximative zero-impedance, x≤0.1%;

S2: relating transformer dimension parameters to the equivalent impedance of the filtering winding; wherein the short-circuit impedances are calculated by:

$$\begin{cases} Z_{k12} = \dfrac{2\pi^2 f \mu_0 N_1 I_1 p_{12} K \sum D_{12}}{H_{12} e_t} \\ Z_{k13} = \dfrac{2\pi^2 f \mu_0 N_1 I_1 p_{13} K \sum D_{13}}{H_{13} e_t} \\ Z_{k23} = \dfrac{2\pi^2 f \mu_0 N_1 I_1 p_{23} K \sum D_{23}}{H_{23} e_t} \end{cases}$$

where f is a fundamental frequency; $I_1$ and $N_1$ are rated current and turns of the primary winding; $\mu_0$ is absolute permeability, and $$\mu_0 = 4\pi \times 10^{-7}$$

H/m; $\rho_{12}$, $\rho_{13}$, $\rho_{23}$ are Rogowski coefficients between the primary winding and the secondary winding, the primary winding and the filtering winding, and the secondary winding and the filtering winding, respectively; K is an additional reactance coefficient; $\Sigma D_{12}$, $\Sigma D_{13}$, $\Sigma D_{23}$ are magnetic flux leakage areas between the primary winding and the secondary winding, the primary winding and the filtering winding, and the secondary winding and the filtering winding, respectively; $e_1$ is an electric potential of each turn; $H_{12}$, $H_{13}$, $H_{23}$, are arithmetic mean height of the primary winding and the secondary winding, the primary winding and the filtering winding, the secondary winding and the filtering winding, respectively;

the Rogowski coefficients are calculated by:

$$\begin{cases} \rho_{12} = 1 - \dfrac{a_2 + a_{23} + a_3 + a_{31} + a_1}{\pi H_{12}} \\ \rho_{13} = 1 - \dfrac{a_3 + a_{31} + a_1}{\pi H_{13}} \\ \rho_{23} = 1 - \dfrac{a_2 + a_{23} + a_3}{\pi H_{13}} \end{cases} ;$$

the magnetic flux leakage areas are determined by:

$$\begin{cases} \sum D_{12} = \dfrac{a_1 r_1}{3} + \dfrac{a_2 r_2}{3} + \dfrac{(a_{23} + a_3 + a_{31})(r_2 + a_2/2 + r_{31} + a_{31}/2)}{2} \\ \sum D_{13} = \dfrac{a_1 r_1}{3} + \dfrac{a_3 r_3}{3} + a_{31} r_{31} \\ \sum D_{23} = \dfrac{a_2 r_2}{3} + \dfrac{a_3 r_3}{3} + a_{23} r_{23} \end{cases} ;$$

wherein $$\begin{cases} r_2 = r_0 + a_{02} + \dfrac{a_2}{2} \\ r_{23} = r_0 + a_{02} + a_2 + \dfrac{a_{23}}{2} \\ r_3 = r_0 + a_{02} + a_2 + a_{23} + \dfrac{a_3}{2} \\ r_{31} = r_0 + a_{02} + a_2 + a_{23} + a_3 + \dfrac{a_{31}}{2} \\ r_1 = r_0 + a_{02} + a_2 + a_{23} + a_3 + a_{31} + \dfrac{a_1}{2} \\ r_4 = r_0 + a_{02} + a_2 + a_{23} + a_3 + a_{31} + a_1 + a_{14} + \dfrac{a_4}{2} \end{cases} ;$$

where $r_0$ is transformer core radius; $r_1$, $r_2$, and $r_3$ are center distances between the transformer core and the primary winding, the transformer core and the secondary winding and the transformer core and the filtering winding, respectively; $r_{23}$ and $r_{31}$ are center distances between the transformer core and air gaps; $a_1$, $a_2$, and $a_3$ are winding thicknesses of the primary winding, the secondary winding, the filtering winding, respectively; $a_{02}$, $a_{23}$, and $a_{31}$ are insulation distances between the transformer core and the secondary winding, the secondary winding and the filtering winding, the filtering winding and the primary winding, respectively;

S3: determining a minimum radial dimension of the inductive filtering transformer in the interval of approximative zero-impedance, to achieve an optimization of the transformer dimension parameters; wherein the minimum radial dimension of the inductive filtering transformer is determined by following equation:

$$d_{min} = \min(r_0 + a_{02} + a_2 + a_{23} + a_3 + a_{31} + a_1).$$

* * * * *